Feb. 17, 1959   A. SOMMER ET AL   2,874,067
REFRACTORY ARTICLE AND METHOD OF MAKING THE SAME
Filed Nov. 19, 1956
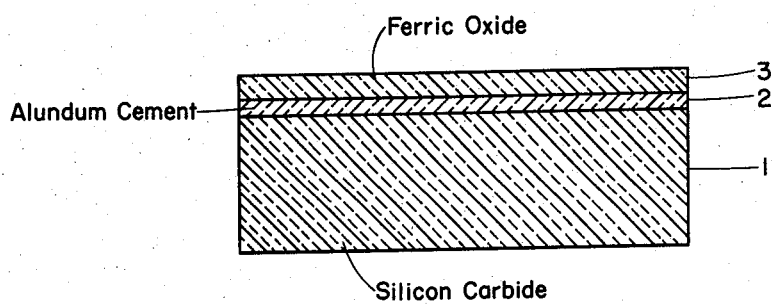
INVENTORS
ALFRED SOMMER
LYNN J. BRADY
BY
Frank R. Trifari
AGENT United States Patent Office 2,874,067
Patented Feb. 17, 1959

2,874,067

REFRACTORY ARTICLE AND METHOD OF MAKING THE SAME

Alfred Sommer, Kingston, N. Y., and Lynn J. Brady, Moorestown, N. J., assignors to North American Philips Company, Inc., New York, N. Y., a corporation of Delaware Application November 19, 1956, Serial No. 623,126

5 Claims. (Cl. 117—70)

The invention relates to a refractory article and method of making the same. More particularly, the invention relates to a carrier adapted for use in high-temperature furnaces such as are used in the manufacture of ceramic bodies.

An object of this invention is a high temperature carrier for use in the manufacture of ceramic bodies which can be reused repeatedly without cracking or warping.

Another object of this invention is a high temperature carrier or support for the manufacture of ceramic bodies which do not adhere to such bodies.

These and further objects of the invention will appear as the specification progresses.

In the manufacture of certain types of ceramic bodies, particularly bodies fired at high temperatures, for example, 1000° C. to 1500° C., supports used as carriers for the bodies frequently warp and crack after one or two firings and have to be replaced. In the manufacture of ceramic ferromagnetic cores, e. g. ferrites, a further problem arises that the bodies frequently adhere to the support or are subject to unequal shrinkage resulting in a loss of this body.

In accordance with this invention it has been found that if we coat a base of refractory material such as silicon carbide with a refractory binding material and an outer coating of iron oxide and fire the coatings at about 1300° C., the resulting body has a longer useful life as a high-temperature support and prevents adherence of the ceramic body to the support during firing.

The invention will be described in connection with the accompanying drawing showing in cross-section, a high-temperature support according to the invention.

In the drawing, 1 is a base of crystalline silicon carbide over which has been sprayed a layer of aluminum oxide cement 2 such as Alundum RA–1084 made by The Norton Company of Worcester, Mass. Over the aluminum oxide cement a layer 3 composed of iron oxide, about 5% by weight of bentonite, and 0.1% by weight of tannic acid in a 10% $NH_4OH$ solution which has been milled for about 48 hours, was applied. The coatings were fired at a temperature of 1310° C. for about 2 hours to sinter the same. The resulting body can be used as a carrier for molded bodies which are sintered into ferrite cores in continuous kiln furnaces at temperatures of 1200° C.–1300° C. without adhering to the ferrite bodies or cracking or warping. The plates can be repeatedly used.

While the invention has been described in connection with specific examples and applications thereof, other modifications will be readily apparent without departing from the spirit and scope of the invention as defined in the appended claims.

What is claimed is:

1. A refractory article comprising a body of crystalline refractory material, a coating on said body consisting essentially of iron oxide, and a layer of refractory binding material between said coating and said body.

2. A refractory article comprising a body of crystalline silicon carbide, a coating on said body consisting essentially of iron oxide, and a layer of refractory binding material between said coating and said base.

3. A refractory article comprising a base of crystalline silicon carbide, a coating on said body consisting essentially of iron oxide, and a layer of aluminum oxide between said coating and said body.

4. A process of manufacturing a refractory article comprising the steps, applying to a base of refractory material a layer of cementitious refractory material, applying over said layer of cementitious material a layer consisting essentially of iron oxide, and firing the so-coated base at a temperature of about 1300° C. to sinter the same.

5. A process of manufacturing a refractory article comprising the steps of, applying to a base of silicon carbide a coating of aluminum oxide, applying over the aluminum oxide a coating consisting essentially of iron oxide with a mixture of 5% by weight of bentonite and tannic acid, and firing the so-coated base at about 1300° C. for about 2 hours to sinter the same.

References Cited in the file of this patent

UNITED STATES PATENTS

| Re. 17,661 | Martin | May 13, 1930 |
| 1,466,213 | Teetor | Aug. 28, 1923 |
| 2,406,909 | Schoenlaub | Sept. 3, 1946 |